United States Patent
Borges et al.

(10) Patent No.: US 8,493,982 B2
(45) Date of Patent: Jul. 23, 2013

(54) TWO AND THREE-STROKE DISCOVERY PROCESS FOR 10G-EPONS

(75) Inventors: Nuno Borges, S. Domingos de Rana (PT); Marek Hajduczenia, Fiaes (PT); Paulo Miguel Monteiro, Ilhavo (PT); Henrique Silva, Coimbra (PT)

(73) Assignee: Adtran GmbH, Berlin-Siemensstrasse (DE)

( * ) Notice: Subject to any disclaimer, the term of this patent is extended or adjusted under 35 U.S.C. 154(b) by 353 days.

(21) Appl. No.: 12/991,339

(22) PCT Filed: May 5, 2009

(86) PCT No.: PCT/EP2009/055387
§ 371 (c)(1),
(2), (4) Date: Jan. 31, 2011

(87) PCT Pub. No.: WO2009/135825
PCT Pub. Date: Nov. 12, 2009

(65) Prior Publication Data
US 2011/0142444 A1    Jun. 16, 2011

(30) Foreign Application Priority Data
May 5, 2008 (EP) .................................. 08103820

(51) Int. Cl.
*H04B 10/00* (2006.01)
(52) U.S. Cl.
USPC ........................ 370/395.51; 370/503; 398/154
(58) Field of Classification Search
USPC .............................. 370/395.51, 503; 398/154
See application file for complete search history.

(56) References Cited

U.S. PATENT DOCUMENTS

| | | | | |
|---|---|---|---|---|
| 2007/0116467 | A1* | 5/2007 | Kwon et al. | 398/72 |
| 2009/0304385 | A1* | 12/2009 | Khermosh | 398/58 |
| 2010/0254707 | A1* | 10/2010 | Peng et al. | 398/58 |
| 2011/0013904 | A1* | 1/2011 | Khermosh et al. | 398/16 |

OTHER PUBLICATIONS

Marek Hajduczenia et al: "10G EPON Standardization in IEEE 802.3av Project" Optical Fiber Communication/National Fiber Optic Engineers Conference, 2008. OFC/NFOEC 2008. Conference On, IEEE, Piscataway, NJ, USA, Feb. 24, 2008, pp. 1-9, XP 031225 6859, ISBN: 978-1-55752-856-8.
Marek Hajduczenia et al: "On EPON Security Issues" IEEE Communiacations Surveys, IEEE, New York, NY US, vol. 9, No. 1, Jan. 1, 2007, pp. 68-83, XP011181094, ISSN: 1553-877X.
Zhongjin Wang et al: "MPCP Design in Prototyping Optical Network Unit of Ethernet in the First Mile" Sep. 6-8, 2004, pp. 121-125, XP010743295.

(Continued)

*Primary Examiner* — Hoon J Chung
(74) *Attorney, Agent, or Firm* — Laurence A. Greenberg; Werner H. Stemer; Ralph E. Locher (57) ABSTRACT

The invention relates to a method to discover Optical Network Units (ONU) with different speed capabilities in an Ethernet Passive Optical Network (EPON) by an Optical Line Termination (OLT), where logical links in the network are identified by Logical Link IDs, and the OLT can transmit and receive data with 1 Gbit/s-speed (1 G) and 10 Gbit/s-speed (10 G), and the discovery process is handled in the OLT by a Multi Point Control Process (MPCP), which exchanges messages as Data Units (MPCPDU) with the ONUs. This is achieved by extending the standard MPCPDUs in a way, that backward compatability is assured.

10 Claims, 4 Drawing Sheets

OTHER PUBLICATIONS

IEEE Std 802.3™ 2005 (Revision of IEEE 802.3-2002 Information technology—Telecommunications and information exchange between systems—Local and metropolitan area networks—Specific requirements—Part 3: Carrier Sense Multiple Access with Collision Detection (CSMA/CD) access method and physical layer specifications Section Five: This section includes Clause 56 through Clause 67 and Annex 58A through Annex 67A.

* cited by examiner

FIG. 1

FIG. 3 eGATE

| Destination Address | 6 B |
|---|---|
| Source Address | 6 B |
| Length/Type=88-08 | 2 B |
| Op-Code=00-02 | 2 B |
| TimeStamp | 4 B |
| Number of Grants/Flags=00-01 | 1 B |
| Grant#1 StartTime | 4 B |
| Grant#1 Length | 2 B |
| Grant#2 StartTime | 4 B |
| Grant#2 Length | 2 B |
| SyncTime | 2 B |
| Options/Reserved | 1 B |
| Pad/Reserved | 4 B |
| FCS | 4 B |

FIG. 2

FIG. 4 eREQ

| Destination Address | 6 B |
|---|---|
| Source Address | 6 B |
| Length/Type=88-08 | 2 B |
| Op-Code=00-04 | 2 B |
| TimeStamp | 4 B |
| Pending Grants | 1 B |
| Options/Reserved | 1 B |
| Pad/Reserved | 37 B |
| FCS | 4 B |

FIG. 5 eREG

| Destination Address | 6 B |
|---|---|
| Source Address | 6 B |
| Length/Type=88-08 | 2 B |
| Op-Code=00-05 | 2 B |
| TimeStamp | 4 B |
| Assigned Port | 2 B |
| Flags | 1 B |
| SyncTime | 2 B |
| Echoed Pending Grants | 1 B |
| Options/Reserved | 1 B |
| Pad/Reserved | 33 B |
| FCS | 4 B |

FIG. 6 eACK

| Destination Address | 6 B |
|---|---|
| Source Address | 6 B |
| Length/Type=88-08 | 2 B |
| Op-Code=00-06 | 2 B |
| TimeStamp | 4 B |
| Flags | 1 B |
| Echoed Assigned Ports | 2 B |
| Echoed SyncTime | 2 B |
| Options/Reserved | 1 B |
| Pad/Reserved | 34 B |
| FCS | 4 B |

TWO AND THREE-STROKE DISCOVERY PROCESS FOR 10G-EPONS

BACKGROUND OF THE INVENTION

Field of the Invention

The invention relates to a method to discover Optical Network Units ONU with different speed capabilities in an Ethernet Passive Optical Network EPON, where the Optical Line Termination OLT can transmit and receive data with 1 Gbit/s-speed and 10 Gbit/s-speed.

There is a high requirement for a seamless support of legacy equipment in an EPON, allowing carriers to take advantage of already deployed 1 Gbit/s ONUs while increasing the channel capacity for some customers. This calls for a complete coexistence of 1 and 10 Gbit/s equipment, sharing the same physical PON plant.

Due to the coexistence of the 1 Gbit/s symmetric (legacy), 10 Gbit/s downstream/1 Gbit/s upstream (emerging asymmetric) as well as symmetric 10 Gbit/s (emerging) ONUs on the same PON plant, it is necessary to extend the Discovery Process defined currently in Clause 64 of the IEEE 802.3-2005 to allow for the proper operation in the multi-data rate environment, where a single OLT can support all three types of the ONUs, with dual rate burst mode transmission in the upstream channel. The Discovery Process is used for two purposes. Firstly, it allows for detection of newly connected ONU units by the OLT, providing them means for registering in the network structure and obtaining access to the shared resources. Secondly, it provides a way for the OLT to measure the Round Trip Time RTT of such a newly connected ONU, which facilitates later granting, by giving the OLT knowledge about the distance of the ONU and allowing it to use an interleaved polling Dynamic Bandwidth Allocation mechanism DBA.

Additionally, the Media Acces Control MAC addresses of the ONU are obtained and individual Logical Links entities are assigned as their network unique identification numbers LLID.

The whole discovery process is driven by the so-called Discovery Agent DA, housed in the OLT and ONUs.

Since two independent stations participate in the Discovery Process an ONU and the OLT, the parameters to be used by the given subscriber station can be defined by the OLT and only notified to the ONU, the so-called two-stroke process. Alternatively, an ONU is notified on the OLT capabilities, selects the transmission parameters and is then notified on their acceptance by the OLT, the three-stroke process. Both, two and three-stroke discovery processes require modifications to MPCPDUs and the protocol itself in order to handle properly the coexistence of both 1 G and 10 G ONUs The discovery process requires the utilization of four different messages, namely GATE, REGISTER_REQ, REGISTER and REGISTER_ACK, carried in MPCP Control Plane Data Units MPCPDUs.

Any modifications to the Discovery Process, proposed for and implemented in the emerging, symmetric and asymmetric 10 G EPON equipment must assure complete backward compatibility with the existing legacy ONUs to provide the gradual transition from symmetric 1 Gbit/s systems through asymmetric, 10 Gbit/s DS capable equipment and ending with symmetric 10 Gbit/s ONUs.

To assure proper operation of the DBA Agents located in the OLT and ONUs, it is necessary to assure the existence of the following functionalities, which are currently unsupported by the Discovery Process:

Identification of the upstream/downstream channel data rate for the given target ONU i.e. assuring that the given remote MAC entity is reachable by appropriate RS mapping function and that the scheduling DBA Agent for the upstream channel has the knowledge on the data rate at which the ONU shall be transmitting during the allocated time slot. Such knowledge is crucial due to the dual rate transmission in the upstream channel, where the OLT DBA Agent must know in advance what data rate the given ONU will be transmitting at to allocate the proper size of the transmission slot.

Identification of the upstream channel ONU capabilities, determining whether the given ONU is 1 Gbit/s, 10 Gbit/s or dual rate capable. Such information is required for proper registration of the particular types of ONUs, especially in the case of dual rate capable devices, which may chose to register in either 1 Gbit/s or 10 Gbit/s Discovery Windows opened by the OLT.

Proper operation over two independent downstream data channels (1 and 10 Gbit/s) as well as TDMA shared, dual rate upstream channel.

The Discovery Process for the emerging 10 Gbit/s EPON systems is under discussion. The so far proposed solutions are similar to the two-stroke mechanism and are limiting this process.

BRIEF SUMMARY OF THE INVENTION

It is the objective of this invention to disclose a Discovery Process to integrate the emerging, symmetric and asymmetric 10 G-EPON equipment into an existing optical network whereby a complete backward compatibility with the existing legacy ONUs is assured, to provide the gradual transition from symmetric 1 Gbit/s systems through asymmetric, 10 Gbit/s downstream capable equipment and ending with symmetric 10 Gbit/s ONUs.

This objective is achieved by the features as claimed. An embodiment of the invention is described in the dependent claims.

The standard discovery process is defined in the the IEEE 802.3-2005 specifications. All the proposed modifications to the defined standard Discovery Process assure the coexistence of legacy 1 Gbit/s and emerging 10 Gbit/s (both symmetric and asymmetric) EPON ONUs on the same fibre plant. This is true for the two-stroke process and the three-stroke process. The MPCP protocol and the MPCPDUs are modified to allow for the proposed extended processes.

The discovery process and the necessars modification are explained by the figures.

DESCRIPTION OF THE INVENTION

Figure 1:
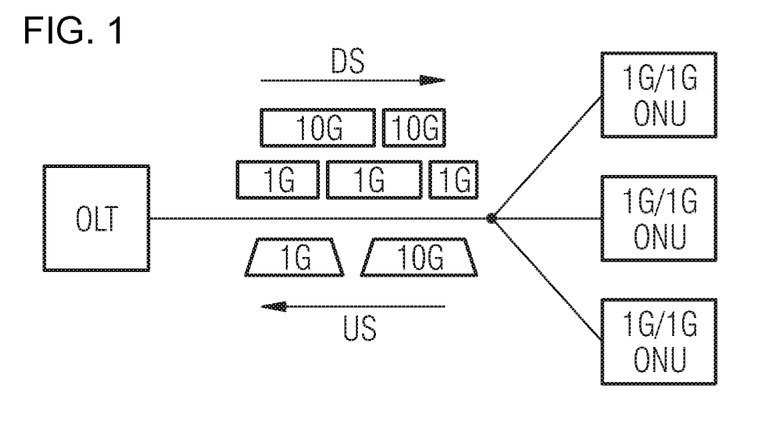
FIG. 1 shows the structure of an EPON with different ONUs.

FIG. 1 shows a PON with an OLT and three different ONUs.

The OLT present in the system is a dual rate capable (both upstream and downstream channel) device, where the downstream transmission in 1 G and 10 G channels is carried out in parallel and independently on different wavelengths of the optical signals, while the upstream channel is shared by 1 G and 10 G data rates via a TDM scheme.

Three types of ONUs are supported, namely: symmetric 1 G/1 G, symmetric 10 G/10 G and asymmetric 10 G/1 G. In this configuration, the ONUs can be discovered in the two-stroke and the three-stroke discovery process.

Figure 2:
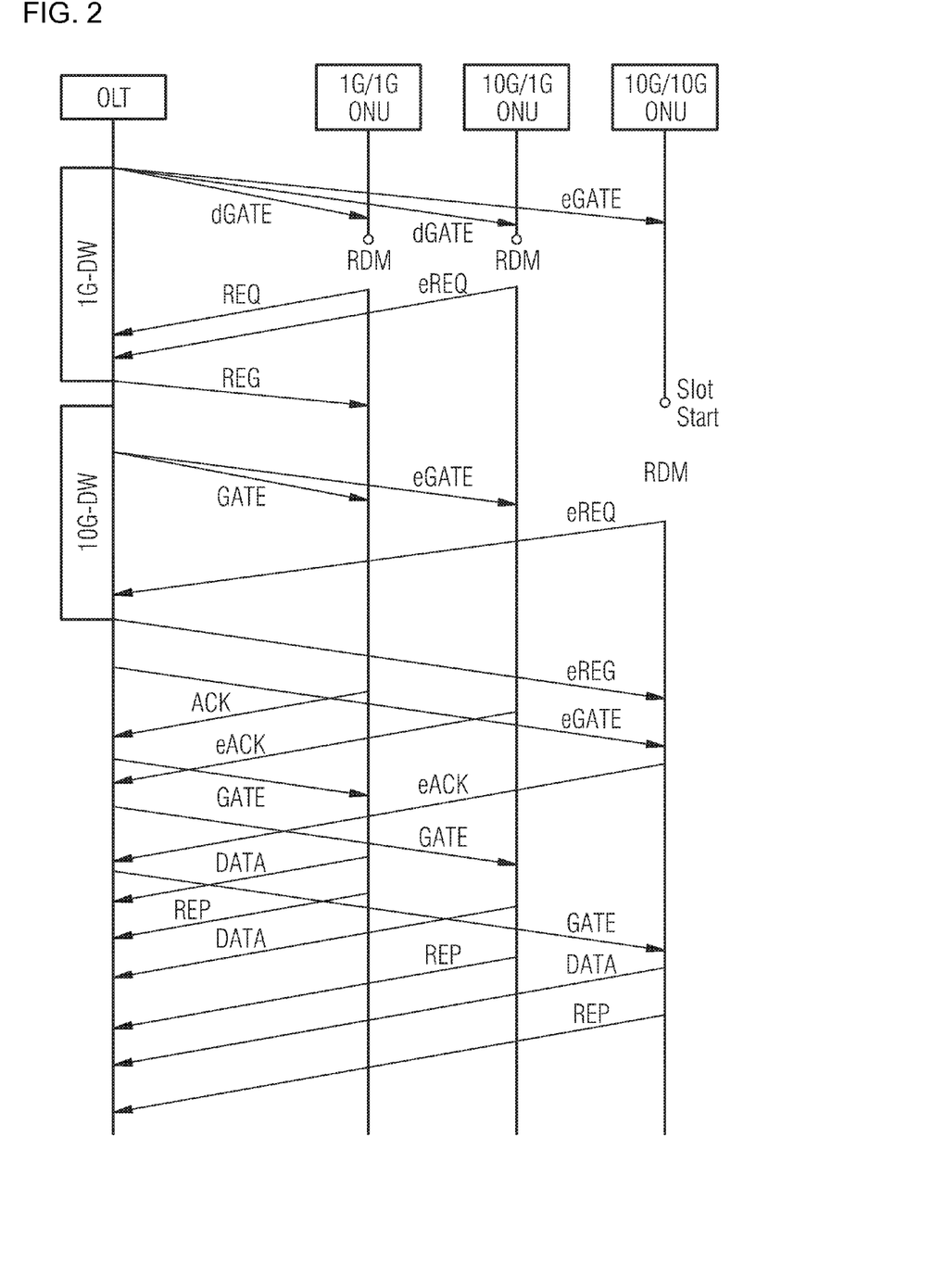
FIG. 2 shows the message flow of the discovery process.

The operation of the Discovery Process is depicted in FIG. 2. The Messages of three types of ONUs are shown, namely: symmetric 1 G/1 G, symmetric 10 G/10 G and asymmetric 10 G/1 G.

The extended Discovery Process may look complicated though its operation is relatively simple to follow.

At the beginning, the OLT-based Discovery Agent initializes the Discovery Process by allocating a new time interval in the upstream channel, during which no previously registered ONU is allowed to transmit any data, comprising thus the so-called Discovery Window. The Discovery Window is an interval reserved by the OLT Discovery Agent with the cooperation of the DBA Agent, when no standard upstream traffic is allowed, leaving room for reception of any registration requests from initialized ONUs. During the said time interval, standard data transmission is suspended in the upstream channel, resulting in the disruptive character of the whole process. No data transmission is disrupted in the downstream channel for the duration of the Discovery Window.

In accordance with the IEEE 802.3-2005 Clause 64, the Discovery and DBA agents at the OLT must exchange information and reach an agreement about the start and duration of the Discovery Window. The parameters to be negotiated by the Agents include the size and beginning of the Discovery Window and, when consensus is reached, a new Discovery Window is allocated in the upstream channel. The DBA agent is responsible for confirming that no active LLID is scheduled a valid transmission window during the requested Discovery Window, while the remaining scheduling tasks are delegated to the Discovery Agent.

Once the bandwidth availability is confirmed, the OLT sends a legacy and extended Discovery GATE MPCPDU (dGATE) in the 1 G and 10 G downstream channels.

A legacy dGATE is received only by the legacy, symmetric 1 G/1 G-ONUs. An extended eGATE is received by new asymmetric 10 G/1 G- and symmetric 10 G/10 G-ONUs. The Discovery Windows 1 G-DW and 10 G-DW are allocated in a non-overlapping manner, maximizing the registration probability for 1 G US and 10 G US compliant ONUs. The extended Discovery GATE MPCPDU eGATE contains the description of the OLT capabilities as well as the definition of the opened Discovery Slots, which is the start time and size for both 1 G and 10 G slots.

10 G/1 G- and 1 G/1 G-ONUs respond to their eGATE or dGATE message after a random delay RDM, creating a single collision domain, whereby both legacy and extended Discovery GATE MPCPDU advertise the same Discovery Slot for all 1 G US capable ONUs. The 10 G/10 G-ONU responds in a separate collision domain, disjoint from the 1 G US capable ONUs. A 1 G/1 G-ONU transmits in the US-channel a legacy Register Req MPCPDU REQ, the 10 G/1 G- and 10 G/10 G-ONUs transmit an extended Register Req MPCPDU eREQ with the appropriate description of the capabilities of the given ONU in the DS- and US-channels. Additionally, the said message shall indicate what data rate the given extended ONU is responding at. For simplicity of the example, it is assumed that none of the issued REQ-messages collides at the OLT.

Upon reception of the uncollided REQ messages, the OLT based Discovery Agent issues REG messages in the DS-channel, followed by the standard GATE message, carrying an US-channel slot allocated for the transmission of the ACK message, which will complete the registration process. The REGISTER MPCPDU (REG) transmitted to 1 G/1 G-ONU is complaint with the legacy specifications. The extended Register MPCPDU eREG transmitted to the 10 G/1 G- and 10 G/10 G-ONU will carry additionally information, i.e. inform the given ONU on the target data rate to be used in the DS- and US-channels.

The ONUs, upon reception of the REG message and the accompanying GATE message, create the appropriate REGISTER_ACK MPCPDU (ACK), set the flags and transmit in the allocated US-channel window. The OLT based Scheduling Agent will make sure that the US-channel slots allocated to all ONUs are non-colliding since all the ONUs in the system belong to a single collision domain. Therefore a single channel is TDM shared with dual rate transmission, as indicated before. The eACK messages indicates, whether the ONU acknowledges the DS/US-channel allocation. This particular functionality may seem superfluous, though might prove useful in the case of dual rate US capable ONUs, which despite the channel allocation performed by the OLT may be e.g. forced to operate at the lower data rate, 1 G instead of 10 G, provided that an excessive Bit Error Rate BER is detected for 10 G-link. Thus, it is provisioned that such an extended functionality may find its application in coexisting systems.

Once the ACK messages are successfully received at the OLT, the Scheduling Agent begins standard transmission, scheduling the upstream channel slots for individual ONUs in an non-overlapping manner. Special care is taken to avoid any potential collisions between the 1 G and 10 G US capable ONUs. Without the information about the data rate at which the given ONU is operating in the US channel, the OLT scheduler would have to rely on timing information to assess the actual data rate. Thanks to the extended Discovery Process, the data rate information is delivered directly by the ONUs to the OLT.

The operation of the two-stroke Discovery Process is similar to the three-stroke process. The initial steps are inherently the same due to the utilization of a common, extended Discovery GATE MPCPDU eGATE.

As indicated before, in the two-stroke Discovery Process, the ONU is allowed to set its US-channel data rate, which is then communicated to the OLT, which may only confirm the successful allocation. This process starts with the REGISTER_REQ MPCPDU (REQ), where the ONU notifies the OLT on its US-channel capabilities, which are the data rates the given ONU supports, as well as the selected data rate. The ONU capabilities shall be notified to the OLT to handle properly dual rate US capable ONUs—if such devices are deployed and excessive BER is detected e.g. at 10 G channel, the given ONU might be reregistered and forced to use 1 G channel instead to improve the link integrity.

The OLT Discovery Agent, upon reception of uncollided REGISTER_REQ MPCPDUs (REQ), acknowledges or not the US channel selected by the given ONU, by sending in the DS a REGISTER MPCPDU (REG) with the ACK/NACK flag set accordingly. The OLT Agent may deny the registration at the given data rate, in which case the ONU is allowed to attempt registration again, without changing the data rate selection policy. Additionally, the OLT Agent may deny the registration and indicate the preferred data rate for the given ONU, providing that such a data rate is supported as announced in the previous REGISTER_REQ MPCPDU (REQ). This functionality is obviously limited to the dual rate US capable ONUs. Single data rate devices do not have the ability to transmit at a different data rate.

At the end of the Discovery Process, both legacy and extended ONUs transmit in the US-channel a REGISTER_ACK MPCPDU (ACK). Transmission of such a MPCPDU indicates the confirmation that the ONU and its higher stack layers confirm allocation and shall use the announced channel parameters for future data exchange.

Figure 3:
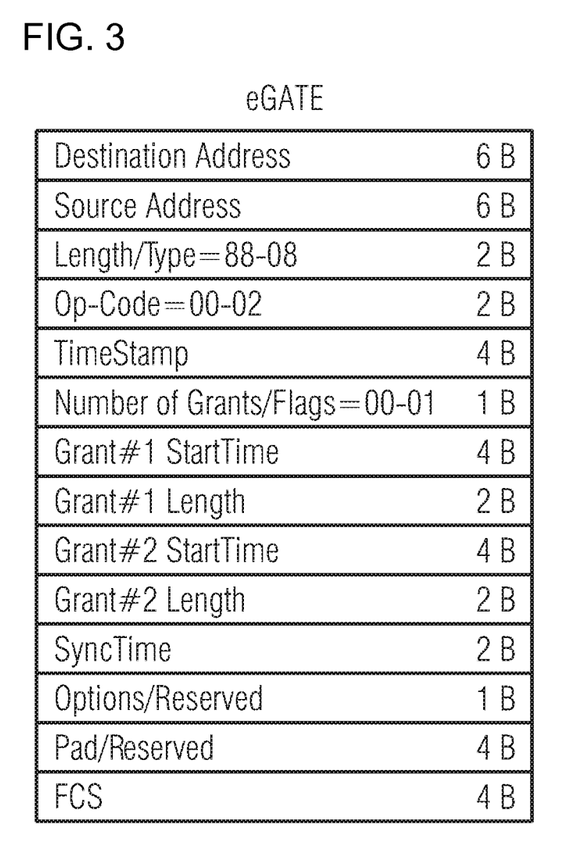
FIG. 3 shows the internal structure of the eGATE MPCPDU.

In FIG. 3 the structure of the extended Discovery GATE MPCPDU eGATE is shown. This structure corresponds mainly to the standard legacy MPCPDU, defined in the standard.

Each field of the DU is presented with its length, counted in Bytes B.

The modifications comprise allocating 4 bits from the Options field to indicate particular functionalities, i.e.:

ACK DS (bit 0): the ONU confirms the allocation of the DS data channel.

NACK DS (bit 1): the ONU rejects the allocated DS data channel.

ACK US (bit 2): the ONU confirms the allocation of the US data channel.

NACK US (bit 3): the ONU rejects the allocated US data channel.

In the case of rejection of either downstream and/or upstream channel allocations, the given LLID shall remain unregistered until the following Discovery Window is opened and a new registration attempt can be effected. Rejection of the particular US/DS channel allocation does not enforce any particular interpretation i.e. such an event may be caused by the higher layer entity forcing the ONU to operate at lower/higher data rate, poor BER observed at the particular data channel allocated by the OLT etc.

All remaining bits in the Reserved field (bits 4-7) shall be reset and ignored upon reception.

Figure 4:
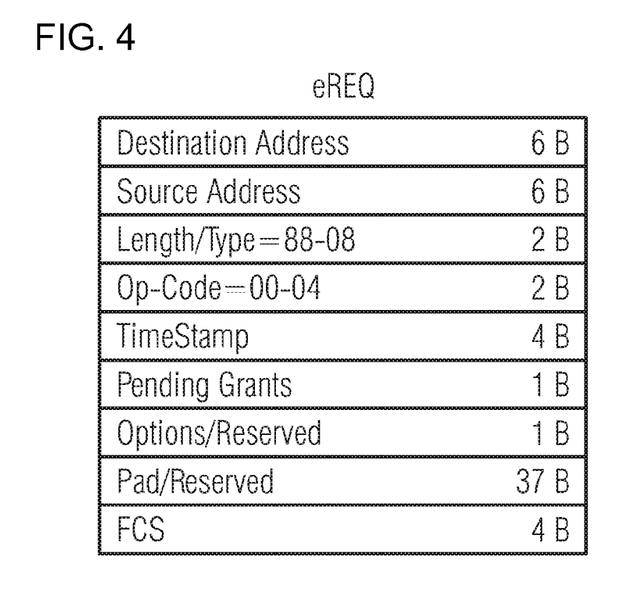
FIG. 4 shows the internal structure of the eREQ MPCPDU.

As in FIG. 3 in FIG. 4 the structure of the extended Discovery REGISTER_REQ MPCPDU eREQ is shown. This structure corresponds mainly to the standard legacy MPCPDU, defined in the standard. Also the length of each field is indicated.

The modified, extended REGISTER_REQ MPCPDU is the first data unit transmitted in the upstream channel by the given ONU or the LLIDs during the registration process. In the case of three-stroke Discovery Process, the ONU notifies the OLT about is transmission capabilities for both downstream and upstream channels, thanks to which the OLT will have a chance to allocate the given ONU to particular transmission channel, most commonly the upstream one since dual downstream rate ONUs are unlikely to emerge due to economic reasons.

To allow for such reporting of the capabilities of the ONU, the extended REGISTER_REQ MPCPDU will be modified in the three-stroke process as follows:

1 G DS capable field (bit 0): if set, the ONU informs the compliant OLT that it is capable of receiving 1 G downstream transmissions;

10 G DS capable field (bit 1): if set, the ONU informs the compliant OLT that it is capable of receiving 10 G downstream transmissions;

1 G US capable field (bit 2): if set, the ONU informs the compliant OLT that it is capable of performing 1 G upstream transmissions;

10 G US capable field (bit 3): if set, the ONU informs the compliant OLT that it is capable of performing 10 G upstream transmissions;

In the two-stroke process the modifications are as follows:

1 G US capable field (bit 0): if set, the ONU informs the compliant OLT that it is capable of performing 1 G upstream transmissions;

10 G US capable field (bit 1): if set, the ONU informs the compliant OLT that it is capable of performing 10 G upstream transmissions;

1 G US registration attempt (bit 2): if set, the ONU informs the compliant OLT that the given registration attempt is being carried out at 1 G data rate;

10 G US registration attempt (bit 3): if set, the ONU informs the compliant OLT that the given registration attempt is being carried out at 10 G data rate;

An ONU, capable of dual rate operation in the downstream channel (i.e. capable of receiving either 1 G or 10 G channels), would set bits 0 and 1. An ONU capable of only single data rate operation would set either bit 0 or 1, depending on actual downstream rate it is operating at. It is explicitly required for at least one of the said bits to be set—a REGISTER_REQ MPCPDU with bits 0 and 1 reset will be ignored on reception.

An ONU, capable of dual rate operation in the upstream channel (i.e. capable of transmitting at either 1 G or 10 G channels), would set bits 2 and 3. An ONU capable of only single data rate operation would set either bit 2 or 3, depending on actual upstream rate it is operating at. It is explicitly required for at least one of the said bits to be set—a REGISTER_REQ MPCPDU with bits 2 and 3 reset will be ignored on reception.

All remaining bits in the Reserved field (bits 4 . . . 7) shall be reset (set to 0s) and ignored upon reception.

Figure 5:
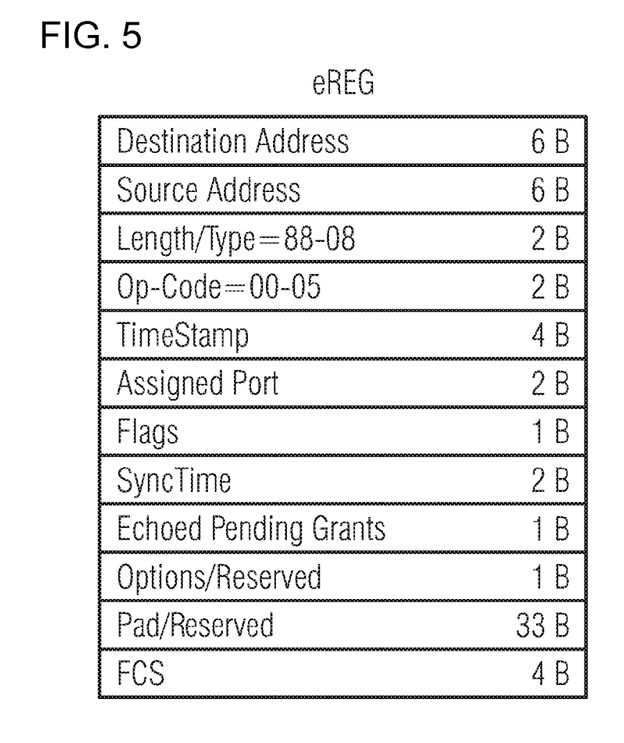
FIG. 5 shows the internal structure of the eREG MPCPDU.

As in FIG. 3 in FIG. 5 the structure of the extended Discovery REGISTER MPCPDU eREG is shown. This structure corresponds mainly to the standard legacy MPCPDU, defined in the standard. Also the length of each field is indicated.

The modifications in the three-stroke process to the extended REGISTER MPCPDU comprise allocating 4 bits from the Options field to indicate particular functionalities, i.e.:

Use 1 G DS (bit 0): if set, the particular ONU shall use the 1 G downstream channel for reception of datagrams transmitted from the OLT.

Use 10 G DS (bit 1): if set, the particular ONU shall use the 10 G downstream channel for reception of datagrams transmitted from the OLT.

Use 1 G US (bit 2): if set, the particular ONU shall use the 1 G upstream channel for transmission of the next datagram in the upstream channel.

Use 10 G US (bit 3): if set, the particular ONU shall use the 10 G upstream channel for transmission of the next datagram in the upstream channel.

The change in the US and/or DS data rate affects all the LLIDs associated with the given ONU and is reflected on the OLT side by moving all the LLIDs associated with the given ONU from any previous US and/or DS domain to the specific US and/or DS domain (if applicable). Such a functionality is required since an ONU may not operate with 2 data rates in DS channel and it is impossible for it to operate at 2 data rates in the US channel (both 1 G and 10 G ONUs operate in the same transmission window of 1310 nm, 1 G centered around 1310 nm with ±50 nm, 10 G centered around 1270 nm±10 nm). In the case of multiple LLID per ONU, it is therefore necessary to assure that all the LLIDs are receiving and transmitting at the same data rates; otherwise, data rate switching would be required, adding to the cost of this subscriber equipment.

It is therefore stipulated that the OLT Discovery Agent shall assure that only 1 bit is set for DS and US channels i.e. bit 0 or 1 for DS channel and bit 2 or 3 for US channel. A REGISTER MPCPDU with bit 0 and 1 or 2 and 3 set or both bits 0 and 1 or 2 and 3 reset shall be ignored upon reception. In such case, the registering entity should remain unregistered and wait for the next suitable Discovery Window.

All remaining bits in the Reserved field (bits 4 . . . 7) shall be reset and ignored upon reception.

In the two-stroke Discovery Process, the REGISTER MPCPDU is transmitted to the given contending ONU only if the REGISTER_REQ MPCPDU was received successfully. The OLT shall confirm the data channel selected by the ONU in the US channel, providing thus feedback whether the given data rate should be used by the ONU or whether the registration should be repeated at the different data rate if applicable. The modifications to the extended REGISTER MPCPDU comprise allocating 3 bits from the Options field to indicate particular functionalities:

ACK (bit 0): if set, the OLT confirms the allocation of the US channel indicated by the ONU in the REGISTER_REQ MPCPDU;

NACK, use 1 G (bit 1): if set, the OLT denies registration of the given ONU at the selected US channel (either 1 G or 10 G), the ONU is advised to attempt registration at 1 G during the next compliant Discovery Window;

NACK, use 10 G (bit 2): if set, the OLT denies registration of the given ONU at the selected US channel (either 1 G or 10 G), the ONU is advised to attempt registration at 10 G during the next compliant Discovery Window;

NACK (bit 3): if set, the OLT denies registration of the given ONU and does not indicate a target data rate to be used by the ONU during the next compliant Discovery Window;

It is expressly noted that the OLT Discovery Agent shall assure that ACK and neither of NACK bits are set simultaneously. The range of acceptable values of the Options field includes thus: 0x01, 0x02, 0x04 and 0x08. All remaining bits in the Reserved field (bits 4 . . . 7) shall be reset and ignored upon reception.

Figure 6:
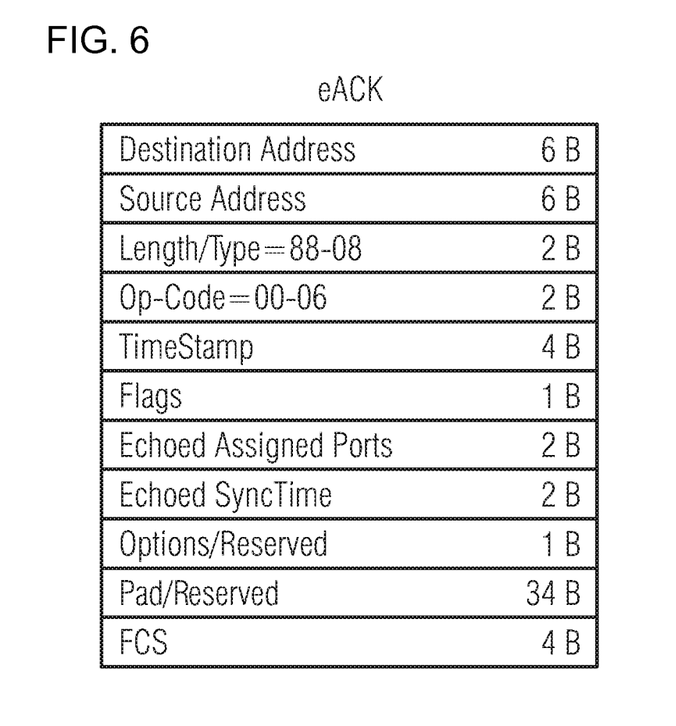
FIG. 6 shows the internal structure of the eACK MPCPDU.

As in FIG. 3 in FIG. 6 the structure of the extended Discovery REGISTER_ACK MPCPDU eREG is shown. This structure corresponds mainly to the standard legacy MPCPDU, defined in the standard. Also the length of each field is indicated. The modifications to the extended REGISTER_ACK MPCPDU comprise allocating 4 bits from the Options field to indicate particular functionalities, i.e.:

ACK DS (bit 0): the ONU confirms the allocation of the DS data channel.

NACK DS (bit 1): the ONU rejects the allocated DS data channel.

ACK US (bit 2): the ONU confirms the allocation of the US data channel.

ACK US (bit 3): the ONU rejects the allocated US data channel.

In the case of rejection of either downstream and/or upstream channel allocations, the given LLID remains unregistered until the following Discovery Window is opened and a new registration attempt can be effected. Rejection of the particular US/DS channel allocation does not enforce any particular interpretation i.e. such an event may be caused by the higher layer entity forcing the ONU to operate at lower/ higher data rate, poor BER observed at the particular data channel allocated by the OLT etc.

All remaining bits in the Reserved field (bits 4 . . . 7) shall be reset and ignored upon reception.

In the two-stroke process the REGISTER_ACK shall be transmitted upstream only if the OLT acknowledged previously the US channel selected by the given ONU. Otherwise, the OLT shall not issue the GATE MPCPDU required for transmission of the REGISTER_ACK MPCPDU, thus effectively preventing the ONU from transmitting any registration acknowledgment. As such, the Options field shall contain no additional information bits apart from the ones used already in the Flags field present in the standard REGISTER_ACK MPCPDU. It is therefore acceptable to fill in the Options field with 0s Acronyms 1 G 1 Gbit/s Transmission
10 G 10 Gbit/s Transmission
ACK Register Acknowledge MPCP DU
B Byte
BER Bit Error Rate
DBA Dynamic Bandwidth Allocation
dGATE Discovery GATE MPCP DU for 1 G
DS Downstream
DU MPCP plane Data Unit
DW Discovery Window
eGATE extended Discovery GATE MPCP DU for 10 G
EPON Ethernet Passive Optical Network
FF Flags Field of eGATE
GATE GATE MPCP DU
MAC Media Access Control
MPCP Multi Point Control Process
MCCPDU MPCP plane Data Unit
OF Options Field of eGATE
OLT Optical Line termination
ONU Optical Network Unit
PON Passive Optical Network
REQ Register request MPCP DU
RDM Random Delay Mechanism
TDM Time Division Multiplex
US Upstream

The invention claimed is:

1. A method for discovering Optical Network Units (ONU) with different speed capabilities in an Ethernet Passive Optical Network (EPON) by an Optical Line Termination (OLT), wherein:

logical links in the network are identified by Logical Link IDs (LLID);

the OLT is capable of transmitting and receiving data at a 1 Gbit/s-speed (1 G) and 10 Gbit/s-speed (10 G); and the discovery process is handled in the OLT by a Multi Point Control Process (MPCP), which exchanges messages as Data Units (MPCPDU) with the ONUs;

the method which comprises:

associating a 10 G and a 1 G Downstream (DS) transmission channel with the ONUs;

transmitting for 1 G-ONUs a Discovery GATE MPCPDU (dGATE) by the OLT;

transmitting for 10 G-ONUs an extended Discovery GATE MPCPDU (eGATE) by the OLT;

carrying one Discovery Window (DW) by the extended Discovery GATE MPCPDU (eGATE), if only 1 G Upstream (US) capable ONUs are present and coded in a Flags Field (FF) and an Option Field (OF);

carrying two Discovery Windows (DW) by the extended Discovery GATE MPCPDU (eGATE), if only 10 G Upstream (US) capable ONUs or if 1 G and 10 G Upstream (US) capable ONUs are present and coded in a Flags Field (FF) and an Option Field (OF);

responding by a 1 G-ONU within the 1-G-DW with a register request MPCPDU (REQ);

responding by a 10 G-ONU or by a mixed 1 G/10 G-ONU within the 10-G-DW with an extended register request MPCPDU (eREQ);

notifying the 1 G-ONU with a register MPCPDU (REG) or the 10 G capable ONU with the extended register MPCPDU (eREG) by the OLT about an allocated LLID;

acknowledging the LLID with a register ACK MPCPDU (ACK) by the 1 G-ONU;

acknowledging the LLID with an extended register ACK MPCPDU (eACK) by the 10 G-ONU or by the mixed 1 G/10 G-ONU;

transmitting by the OLT a standard GATE MPCPDU (GATE), containing the allocated LLID and at least one upstream transmission slot (US); and starting a data transmission in US-transmission slot from the ONU to the OLT.

2. The method according to claim 1, which comprises enabling more than one LLID to be mapped to one ONU.

3. The method according to claim 2, which comprises allowing the LLIDS from one ONU to transmit with the same transmission speed.

4. The method according to claim 2, which comprises repeating the discovery process for each LLID in the given ONU.

5. The method according to claim 1, which comprises carrying out a three-stroke-discovery-process wherein a discovery GATE MPCPDU (dGATE) and an extended discovery GATE MPCPDU (eGATE) may contain information about the transmission capabilities of the OLT and the Register Request MPCPDU (REQ) or the extended Register Request MPCPDU (eREq) may contain information about the transmission capabilities of the ONU.

6. The method according to claim 5, which comprises deciding by the OLT the transmission speed to use and notifying by the OLT the ONU with the register MPCPDU (REG) or the extended register MPCPDU (eREG).

7. The method according to claim 6, which comprises confirming, by the ONU, an acceptance using the register ACK MPCPDU (ACK) or the extended register ACK MPCPDU (eACK).

8. The method according to claim 1, which comprises allocating a discovery window by way of the flags field (FF) in the GATE MPCPDU.

9. The method according to claim 8, wherein in extended Discovery GATE MPCPDU (eGATE) the Option Field (OF) contains information about the open Discovery Windows (DW) for 1 G and/or 10 G.

10. The method according to claim 1, wherein in the MPCPDUs the Flag Field contains information that allows the OLT to distinguish immediately extended from legacy messages.

* * * * *